(12) United States Patent
Kobayashi et al.

(10) Patent No.: US 6,518,381 B2
(45) Date of Patent: Feb. 11, 2003

(54) TETRAFLUOROETHYLENE POLYMER FOR STRETCHING

(75) Inventors: Shigeki Kobayashi, Chiba (JP); Jun Hoshikawa, Chiba (JP); Kazuo Kato, Chiba (JP); Hiroki Kamiya, Chiba (JP); Hiroyuki Hirai, Chiba (JP)

(73) Assignees: Asahi Glass Company, Limited, Tokyo (JP); Asahi Glass Fluoropolymers Co., Ltd., Ichihara (JP)

( * ) Notice: Subject to any disclaimer, the term of this patent is extended or adjusted under 35 U.S.C. 154(b) by 17 days.

(21) Appl. No.: 09/970,674

(22) Filed: Oct. 5, 2001

(65) Prior Publication Data

US 2002/0161149 A1 Oct. 31, 2002

(30) Foreign Application Priority Data

Oct. 30, 2000 (JP) .......................... 2000-331277
Oct. 30, 2000 (JP) .......................... 2000-331278
Jul. 26, 2001 (JP) .......................... 2001-226171
Jul. 26, 2001 (JP) .......................... 2001-226179

(51) Int. Cl.$^7$ ............................................. C08F 214/18
(52) U.S. Cl. ................... 526/255; 521/50; 428/304.4; 526/242; 526/250

(58) Field of Search ................... 526/206, 242, 526/250, 255; 428/304.4; 521/50

(56) References Cited

U.S. PATENT DOCUMENTS

RE31,341 E * 8/1983 Koizumi et al. ............ 526/255
6,136,933 A * 10/2000 Jones ......................... 526/242
6,177,533 B1 * 1/2001 Woodward .................. 526/206

FOREIGN PATENT DOCUMENTS

EP    1 016 679    7/2000

* cited by examiner

Primary Examiner—James J. Seidleck
Assistant Examiner—Travis B Ribar
(74) Attorney, Agent, or Firm—Oblon, Spivak, McClelland, Maier & Neustadt, P.C.

(57) ABSTRACT

A tetrafluoroethylene polymer having high stretchability, a fibrillatable character and a non-melt fabricable quality, which has a standard specific gravity of at most 2.160, and a tensile break strength of from 32.0N (3.26 kgf) to 49.0N (5.0 kgf) or an endothermic ratio of at most 0.15 as calculated from the measurement by differential thermal analysis. The tetrafluoroethylene polymer is suitable for stretching operation after paste extrusion.

23 Claims, No Drawings

TETRAFLUOROETHYLENE POLYMER FOR STRETCHING

The present invention relates to a tetrafluoroethylene polymer (hereinafter referred to as PTFE) for stretching. Particularly, it relates to PTFE which is useful suitably for stretching operation after paste extruded molding.

Heretofore, PTFE has been obtained by polymerizing tetrafluoroethylene (hereinafter referred to as TFE) alone, or together with a comonomer, as the case requires, and it has been used for various applications.

PTFE can be produced by an aqueous dispersion polymerization and can be obtained in the form of an aqueous dispersion wherein polymer particles are dispersed, or in the form of a fine powder prepared by coagulation and drying the aqueous polymer dispersion.

Conventional PTFE fine powder has a high melt viscosity and does not easily flow at the melting temperature, and thus, it has a non-melt fabricable quality. Accordingly, PTFE fine powder is usually subjected to paste extruded molding, wherein PTFE fine powder is blended with a lubricant, such lubricated PTFE is molded by extrusion, then the lubricant is removed, and the extruded product thereby obtained is usually fused (sintered) at a temperature higher than the melting point of PTFE and formed into the shape of a final product.

On the other hand, other important products obtainable from PTFE fine powder may be air permeable cloth materials for products such as clothes, tents, membranes for separation, etc. Such products can be obtained by rapidly stretching an extruded product obtained by paste extruded molding of PTFE fine powder in an unsintered state, to impart a nature to let steam permeate, but not to let condensed water permeate.

U.S. Pat. Nos. 4,654,406 and 4,576,869 discloses that at least 75% of stretching uniformity can be accomplished by an improvement in the technology of stretchable PTFE fine powder i.e. by stretching an extruded product obtained by an addition of 17 mass % of a lubricant, at a rate of 10 %/sec to 100 %/sec for at least 1,000%.

However, the level of physical properties required for stretched products obtained by stretching PTFE has become higher year after year, and even a stretched product obtained by this improved PTFE fine powder has a problem that the strength is not sufficient.

It is an object of the present invention to provide PTFE which has high stretchability, a fibrillatable character and a non-melt fabricable quality and has a small standard specific gravity, which is useful suitably for stretching operation after paste extruded molding, and which provides a porous product having high strength.

The present invention provides PTFE having high stretchability, a fibrillatable character and a non-melt fabricable quality, which has a standard specific gravity of at most 2.160 and a tensile break strength of from 32.0N (3.26 kgf) to 49.0N (5.0 kgf). Here, the standard specific gravity means a standard specific gravity as measured by JIS K6935-2.

Further, the present invention provides PTFE having high stretchability, fibrillatable character and a non-melt fabricable quality, which has a standard specific gravity of at most 2.160 and an endothermic ratio of at most 0.15 as calculated from the measurement by differential thermal analysis.

Further, the present invention provides the above PTFE, wherein PTFE is a fine powder.

Further, the present invention provides the above PTFE, wherein PTFE is a dispersed solid component of an aqueous dispersion.

Still further, the. present invention provides a porous material made of PTFE having the above properties, or its article.

Now, the present invention will be described in detail with reference to the preferred embodiments.

PTFE of the present invention may be a homopolymer of TFE, or a copolymer of TFE with a comonomer such as a fluorinated monomer having an ethylenically unsaturated group other than TFE. The fluorinated monomer having an ethylenically unsaturated group may, for example, be hexafluoropropylene, perfluorobutene-1, perfluorohexene-1, perfluorononene-1, perfluoro(methyl vinyl ether), perfluoro (ethyl vinyl ether), perfluoro(propyl vinyl ether), perfluoro (heptyl vinyl ether), (perfluoromethyl)ethylene, (perfluorobutyl)ethylene or chlorotrifluoroethylene. Such fluorinated monomers may Ibe used alone or may be used in combination as a mixture of two or more of them. The comonomer is usually preferably at most 1 mass %, more preferably at most 0.5 mass %.

PTFE of the present invention has high stretchability, a fibrillatable character and a non-melt fabricable quality. These properties are properties which are usually required for paste extruded molding.

Further, PTFE of the present invention has a standard specific gravity and a tensile break strength, or a standard specific gravity and an endothermic ratio, which are within specific ranges, and it is thereby characterized.

The standard specific gravity (hereinafter referred to as SSG) of PTFE of the present invention, is at most 2.160, preferably at most 2.157. SSG is an index of an average molecular weight. SSG of PTFE of the present invention has a very small value, thus indicating a high average molecular weight. SSG tends to decrease as the average molecular weight increases. Namely, with PTFE of the present invention, the value of SSG is small, and accordingly, it is expected that its average molecular weight is considerably high. PTFE having a SSG value of at most 2.160, will have a stretching ratio of its extruded product exceeding 3,000% and is excellent also in stretching uniformity.

The tensile break strength of a stretched product of PTFE of the present invention is within a range of from 32.0N (3.26 kgf) to 49.0N (5.0 kgf), preferably from 34.3N (3.5 kgf) to 49.0N (5.0 kgf). Surprisingly, this is higher than the tensile break strength of PTFE disclosed in JP-A-2000-143727. The higher the tensile break strength, the better the durability, etc., such being desirable. On the other hand, PTFE having a tensile break strength exceeding 49.0N (5.0 kgf), tends to be practically very difficult to produce.

The endothermic ratio of PTFE of the present invention is at most 0.15, preferably at most 0.13, more preferably at most 0.10. This endothermic ratio is defined by the measurement of an endothermic ratio, as will be described hereinafter. Usually, in the crystal fusion behavior by a differential thermal analysis of PTFE, a plurality of peaks are observed, which indicates that there are the corresponding number of differences in the crystal structure, etc. In the stretching operation, the structure should better be the same as much as possible, so that uniform stretching can be carried out, and a porous material thereby obtainable will have excellent properties. The endothermic ratio is an index to show the uniformity of the structure, and the smaller the endothermic ratio, the smaller the irregularity in the structure in PTFE. If the endothermic ratio exceeds 0.15, stretching at a high stretching ratio tends to be difficult, or the tensile break strength tends to be small.

In a case where the endothermic ratio of PTFE is at most 0.15, the tensile break strength of a stretched product of PTFE is preferably within a range of from 19.6N (2.0 kgf) to 49.0N (5.0 kgf), more preferably within a range of from 29.4N (3.0 kgf) to 49.0N (5.0 kgf), particularly preferably within a range of from 34.3N (3.5 kgf) to 49.0N (5.0 kgf).

Further, PTFE of the present invention is preferably one, of which the extrusion pressure is from 9.8 MPa (100 kgf/cm$^2$) to 19.6 MPa (200 kgf/cm$^2$), more preferably from 9.8 MPa (100 kgf/cm$^2$) to 16.7 MPa (170 kgf/cm$^2$), particularly preferably from 9.8 MPa (100 kgf/cm$^2$) to 15.2 MPa (155 kgf/cm$^2$).

Of PTFE of the present invention, the stress relaxation time is preferably at least 650 seconds, more preferably at least 700 seconds, particularly preferably at least 730 seconds.

PTFE of the present invention can be produced by aqueous dispersion polymerization.

The aqueous dispersion polymerization can be carried out by using TFE alone or TFE together with a comonomer, in an aqueous medium containing a dispersant and a polymerization initiator. The polymerization temperature is usually within a range of from 50 to 120° C., preferably within a range of from 60 to 100° C. The polymerization pressure may be suitably selected, but it is usually within a range of from 0.5 to 4.0 MPa, preferably within a range of from 1.0 to 2.5 MPa.

As the dispersant, an anionic surfactant having little chain transfer property is preferred, and a surfactant of a fluorocarbon type is particularly preferred. Specifically, $XC_nF_{2n}COOM$ (wherein X is hydrogen, chlorine, fluorine or $(CF_3)_2CF$, M is hydrogen, $NH_4$ or an alkali metal, and n is an integer of from 6 to 12), $C_mF_{2m+1}O(CF(CF_3)CF_2O)_p CF(CF_3)COOM$ (wherein M is hydrogen, $NH_4$ or an alkali metal, n is an integer of from 1 to 12, and p is an integer of from 0 to 5), $C_nF_{2n+1}SO_3M$ or $C_nF_{2n+1}CH_2CH_2SO_3M$, may, for example, be mentioned. A surfactant of a perfluorocarbon type is more preferred, and $C_7F_{15}COONH_4$, $C_8F_{19}COONH_4$, $C_9Fl_9COONH_4$, $C_{10}F_{21}COONH_4$, $C_7F_{15}COONa$, $C_8F_{17}COONa$, $C_9F_{19}COONa$, $C_7F_{15}COOK$, $C_8F_{17}COOK$, $C_9F_{19}COOK$ or $C_2F_7O(CF(CF_3)CF_2O)_2CF(CF_3)COONH_4$, may, for example, be mentioned. These surfactants may be used alone or in combination as a mixture of two or more of them. The amount of the surfactant is preferably within a range of from 250 to 5,000 ppm, based on the mass of water to be used. Within this range, the stability of the aqueous dispersion will be improved, and the tensile break strength of PTFE thereby obtainable, will be high. Further, in order to further improve the stability of the aqueous dispersion, it may be preferred to further add a dispersant during the polymerization.

The polymerization initiator is preferably a water-soluble radical polymerization initiator or water-soluble redox type polymerization initiator. The water-soluble radical polymerization initiator is preferably a persulfate such as ammonium persulfate or potassium persulfate, or a water-soluble organic peroxide such as bissuccinic acid peroxide, bisglutaric acid peroxide or tert-butyl hydroperoxide. These initiators may be used alone or in combination as a mixture of two or more of them.

It is particularly preferred to use a redox type polymerization initiator, whereby it is possible to obtain PTFE with a low SSG, a low extrusion pressure and a high tensile break strength. The redox type polymerization initiator is preferably a combination of a water-soluble oxide such as a persulfate or a bromate, with a reducing agent such as a sulfite or a diimine. Particularly, a combination of a bromate with a sulfite, is more preferred as the redox type polymerization initiator. Most preferred is a combination of potassium bromate with ammonium sulfite. In a case where a bromate and a sulfite are used, it is preferred that either one is preliminarily charged into an autoclave, and then the other is continuously or intermittently added to initiate polymerization. It is more preferred that a bromate is preliminarily charged into the autoclave and then a sulfite is continuously or intermittently added. The amount of the polymerization initiator may suitably be selected, but it is usually preferably from 2 to 600 ppm, based on the mass of water. In the case of a combination of a bromate and a sulfite, the amount of each is preferably from 5 to 300 ppm. Further, when a bromate is preliminarily charged into the autoclave, the stability of the aqueous dispersion can further be improved by increasing the concentration of the bromate. The amount of the polymerization initiator is preferably small, since the smaller the amount of the polymerization initiator, the smaller the standard specific gravity of the obtainable PTFE, i.e. the larger the average molecular weight of the obtainable PTFE. Further, if the amount of the polymerization initiator is too small, the polymerization rate tends to be slow, and if it is too much, SSG of the resulting PTFE tends to be high.

The aqueous dispersion polymerization is preferably carried out in the presence of a stabilizing assistant. As such a stabilizing assistant, paraffin wax, fluorinated oil, fluorinated solvent or silicone oil may, for example, be preferred. These stabilizing assistants may be used alone or in combination as a mixture of two or more of them. It is particularly preferred to carry out the aqueous dispersion polymerization in the presence of paraffin wax. The paraffin wax may be liquid, semisolid or solid at room temperature, and it is preferably a saturated hydrocarbon having at least 12 carbon atoms. The melting point of the paraffin wax is usually preferably from 40 to 65° C., more preferably from 50 to 65° C. The amount of the paraffin wax is preferably from 0.1 to 12 mass %, more preferably from 0.1 to 8 mass %, based on the mass of water to be used.

The aqueous dispersion polymerization is carried out usually by mildly stirring the aqueous polymerization mixture. The stirring conditions are controlled so that fine particles of PTFE formed in the aqueous dispersion will not coagulate. The aqueous dispersion polymerization is carried out usually until the concentration of the fine particles of PTFE in the aqueous dispersion becomes from 15 to 40 mass %.

It is preferred to carry out the aqueous dispersion polymerization in an acidic state by an addition of an acid, from the viewpoint of stabilization of the aqueous dispersion. As the acid, an acid such as sulfuric acid, hydrochloric acid or nitric acid is preferred. Particularly preferred is nitric acid. By the addition of nitric acid, the stability of the aqueous dispersion will be further improved.

By the aqueous dispersion polymerization, an aqueous dispersion having fine particles of PTFE dispersed, can be obtained. However, particle diameters of fine particles of PTFE in the aqueous medium usually have a wide distribution of from 0.02 to 1.0 μm, and the average particle diameter is from about 0.1 to 0.4 μm.

The fine particles of PTFE may be coagulated from the obtained aqueous dispersion and dried to obtain PTFE fine powder. As the coagulation method, it is preferred that the aqueous dispersion is stirred at a high rate to coagulate fine particles of PTFE. At that time, it is preferred to add a coagulating agent. As the coagulating agent, ammonium carbonate, a polyvalent organic salt, a mineral acid, a cationic surfactant or an alcohol may, for example, be preferred. Particularly preferred is ammonium carbonate.

Drying of PTFE fine powder obtainable by coagulation, can be carried out at an optional temperature, but it is preferred to carry out the drying within a range of from 100 to 250° C., particularly preferably within a range of from 130 to 200° C. By the drying, PTFE fine powder of the present invention can be obtained. This PTFE fine powder is preferably one, of which the average particle diameter is within a range of from 100 to 800 µm, particularly preferably within a range of from 400 to 600 µm.

Further, the present invention provides a porous material made of PTFE having the above-described properties, and its article. The porous material may be those produced by various methods. For example, a porous material obtainable by applying stretching after paste extruded molding, and a film, a tube, etc. made of such a porous material, may be mentioned.

The paste extruded molding is one wherein PTFE fine powder is mixed with a lubricant to give flowability to the PTFE fine powder, followed by molding to obtain a molded product such as a sheet, a tube or the like. The blend ratio of the lubricant may suitably be selected so that flowability is given to the PTFE fine powder, and it is usually from 10 to 30 mass %. As the lubricant, naphtha or a petroleum type hydrocarbon having a boiling point of at least 200° C., is preferably employed. Further, stretching may be carried out at a suitable rate, for example, at a rate of from 5 %/sec to 100 %/sec, for a proper stretching ratio, for example, for a stretching ratio of at least 500%.

The porosity of the porous material is not particularly limited. Usually, however, the porosity is preferably within a range of from 50 to 97%, particularly preferably within a range of from 70 to 95%.

The shape of the article made of the porous material may be made to be various shapes such as a sheet shape, a film shape, a fibrous shape, etc.

Now, the present invention will be described in further detail with reference to Examples. However, it should be understood that the present invention is by no means restricted to such specific Examples. In the following, "parts" means "parts by mass". Examples 1 to 5 represent Working Examples of the present invention, and Example 6 represents a Comparative Example.

Further, in the Examples, evaluation of the stretchability, measurement of the tensile break strength, measurement of the endothermic ratio and measurement of the stress relaxation time, were carried out by the following methods.

(1) Evaluation of the extrusion pressure and the stretchability 100 g of PTFE fine powder left to stand at room temperature for at least two hours, was put into a glass bottle having an internal capacity of 900 cc, and 21.7 g of an Isoper H lubricant (trademark, manufactured by Exxon Chemical Japan Ltd.) was added, followed by mixing for 3 minutes to obtain a PTFE mixture. The obtained PTFE mixture was left to stand for two hours in a constant temperature oven of 25° C and then subjected to paste extrusion through an orifice having a diameter of 2.5 cm, a land length of 1.1 cm and an entrance angle of 30° at 25° C. under such conditions that the reduction ratio (the ratio of the inlet cross section to the outlet cross section of the die) was 100, and the extrusion rate was 51 cm/min, to obtain a beading. The pressure required for extrusion at that time, was measured and taken as the extrusion pressure. The obtained beading was dried at 230° C. for 30 minutes, whereby the lubricant was removed. Then, the length of the beading was cut into a suitable length, and each end was clamped so that the distance between the clamps became either 3.8 cm or 5.1 cm, followed by heating at 300° C. in an air circulating oven. Then, stretching was carried out at a predetermined rate until the distance between the clamps became a predetermined level. This stretching method was essentially the same as the method disclosed in U.S. Pat. No. 4,576,869 except that the extrusion speed (51 cm/min) was different. "Stretching" is an increase in length and is usually represented in relation to the initial length.

(2) Measurement of the tensile break strength

A sample for the measurement by the tensile break strength test was prepared by stretching the beading in the same manner as in the evaluation of the stretchability, using a clamp distance of 5.1 cm, a stretching rate of 100 %/sec. and a total stretching of 2,400%. The tensile break strength was measured as the minimum tensile break load (force) of three samples obtained from a stretched beading, i.e. one from each end of the stretched beading (excluding any neck-down within the clamped range), and one from its center. It was measured at room temperature by means of a tensile tester (manufactured by A & D Company) by clamping the sample by a jaw having a gauge length of 5.0 cm and driving a movable jaw at a speed of 30 cm/min.

(3) Measurement of the endothermic ratio

A differential scanning calorimeter (DSC-7, manufactured by PERKIN ELMER) was used for the smeasurement. 10.0 mg of a sample was used and maintained at an initial temperature of 200° C. for one minute and then heated to 380° C. at a rate of 10° C./min, to obtain a differential thermal curve. A base line was obtained by connecting the point of 310° C. and the point of 350° C. on the obtained differential thermal curve. The length of a line from the highest peak on the differential thermal curve to the base line, was designated as A. The length from a point on the base line 10° C. lower than the intersection point of the line from the highest peak to the base line, to the differential thermal curve, was designated as B. A value of B/A was taken as the endothermic ratio.

(4) Measurement of the stress relaxation time

A sample for measurement of the stress relaxation time was prepared by stretching a beading in the same manner as in the evaluation of the stretchability, using a clamp distance of 3.8 cm, a stretching rate of 1,000 %/sec. and a total stretching of 2,400%. This sample was a stretched beading having a total length of 25 cm tightly tensioned by fixing both ends to fixtures. The stress relaxation time is a time required for breakage after the sample was left to stand in an oven at 390° C. i.e. a temperature higher than 380° C. for dissolution of an extended chain shape as disclosed in U.S. Pat. No. 5,470,655. The sample fixed to the fixtures was inserted into the oven through a slot located (and covered) on the side portion of the oven, whereby the temperature did not decrease during the arrangement of the sample, and accordingly, it was not required to take some time for the recovery as disclosed in U.S. Pat. No. 4,576,869.

EXAMPLE 1

Into a 100 l autoclave, 928 g of paraffin wax, 55 l of ultrapure water, 36 g of ammonium perfluorooctanoate, 1 g of succinic acid, 8 ml of a 1N nitric acid aqueous solution and 0.4 g of potassium bromate, were charged. Nitrogen purge and deaeration were carried out, and then, the temperature was raised to 65° C. After stabilization of the temperature, TFE was introduced to a pressure of 1.9 MPa. While stirring the content, 1 l of an aqueous solution containing 140 ppm of ammonium sulfite was continuously added for 60 minutes to initiate polymerization. As the polymerization proceeded, TFE was consumed, and the pressure in the autoclave decreased. Therefore, TFE was continuously fed in order to maintain the pressure to be constant. After completion of the addition of ammonium sulfite, 1 l of an aqueous solution containing 11.1 mass % of ammonium perfluorooctanoate was added. Upon expiration of 270 minutes from the initiation of the polymerization, stirring and the feed of TFE were stopped, and TFE in the autoclave was purged, is and then, the gas phase was replaced with nitrogen. The obtained PTFE aqueous dispersion containing 28.9 mass % of a solid content, was coagulated in the presence of ammonium carbonate, whereupon coagulated PTFE fine powder was separated. The obtained wet PTFE fine powder was dried at 160° C. to obtain PTFE fine powder. And, SSG and the average particle diameter of the obtained PTFE fine powder were measured. Further, the obtained PTFE fine powder was subjected to paste extrusion by the above-described method, to obtain a beading. The extrusion pressure at that time was measured. Then, the beading was stretched, and the tensile break strength and the stress relaxation time of the stretched beading were measured.

Then, 600 g of PTFE fine powder was put into a glass bottle, and an Isoper G lubricant (manufactured by Exxon Chemical Japan Ltd.) was added at a ratio of 20 wt %, followed by mixing by rotation at a speed of 100 rpm for 30 minutes. The blended PTFE was aged at room temperature for 24 hours. This PTFE was pressed under a pressure of 0.2 MPa for 120 seconds to obtain a perform having a diameter of 68 mm. This perform was extruded through an orifice having a diameter of 11 mm, and the extruded product was rolled to a thickness of 0.1 mm. The rolled sheet was formed into a strip having a length of 5 cm and a width of 2 cm and stretched ten times at a rate of 100 %/sec at a temperature of 300° C. The obtained film had a porosity of 90%.

EXAMPLE 2

Into a 100 l autoclave, 928 g of paraffin wax, 55 l of ultrapure water, 36 g of ammonium perfluorooctanoate, 1 g of succinic acid, 8 ml of a 1N nitric acid aqueous solution and 0.4 g of potassium bromate, were charged. Nitrogen purge and deaeration were carried out, and then, the temperature was raised to 85° C. After stabilization of the temperature, TFE was introduced to a pressure of 1.9 MPa. While stirring the content, 1 l of an aqueous solution containing 140 ppm of ammonium sulfite was continuously added for 60 minutes to initiate polymerization. As the polymerization proceeded, TFE was consumed, and the pressure in the autoclave decreased. Therefore, TFE was continuously fed in order to maintain the pressure to be constant. After completion of the addition of ammonium sulfite, 1 l of an aqueous solution containing 11.1 mass % of ammonium perfluorooctanoate was added. Upon expiration of 270 minutes from the initiation of the polymerization, stirring and the feed of TFE were stopped, and TFE in the autoclave was purged, and then, the gas phase was replaced with nitrogen. The obtained PTFE aqueous dispersion containing 29.6 mass % of a solid content, was coagulated in the presence of ammonium carbonate, whereupon coagulated PTFE fine powder was separated. The obtained wet PTFE fine powder was dried at 250° C. to obtain PTFE fine powder. In the same manner as in Example 1, SSG and the average particle diameter of the PTFE fine powder, the extrusion pressure during the paste extrusion, and the tensile break strength and the stress relaxation time of the stretched beading, were measured.

EXAMPLE 3

Into a 100 l autoclave, 928 g of paraffin wax, 55 l of ultrapure water, 25 g of ammonium perfluorooctanoate, 1 g of succinic acid, 8 ml of a 1N nitric acid aqueous solution and 0.4 g of potassium bromate, were charged. Nitrogen purge and deaeration were carried out, and then, the temperature was raised to 85° C. After stabilization of the temperature, TFE was introduced to a pressure of 1.9 MPa. While stirring the content, 1 l of an aqueous solution containing 140 ppm of ammonium sulfite was continuously added for 60 minutes to initiate polymerization. As the polymerization proceeded, TFE was consumed, and the pressure in the autoclave decreased. Therefore, TFE was continuously fed in order to maintain the pressure to be constant. After completion of the addition of ammonium sulfite, 1 l of an aqueous solution containing 11.1 mass % of ammonium perfluorooctanoate was added. Upon expiration of 250 minutes from the initiation of the polymerization, stirring and the feed of TFE were stopped, and TFE in the autoclave was purged, and then, the gas phase was replaced with nitrogen. The obtained PTFE aqueous dispersion containing 24.1 mass % of a solid content, was coagulated in the presence of ammonium carbonate, whereupon coagulated PTFE fine powder was separated. The obtained wet PTFE fine powder was dried at 140° C. to obtain PTFE fine powder. In the same manner as in Example 1, SSG and the average particle diameter of the PTFE fine powder, the extrusion pressure during the paste extrusion, and the tensile break strength and the stress relaxation time of the stretched beading, were measured.

EXAMPLE 4

Into a 100 l autoclave, 928 g of paraffin wax, 55 l of ultrapure water, 25 g of ammonium perfluorooctanoate, 1 g of succinic acid, 8 ml of a 1N nitric acid aqueous solution and 6 g of potassium bromate, were charged. Nitrogen purge and deaeration were carried out, and then, the temperature was raised to 85° C. After stabilization of the temperature, TFE was introduced to a pressure of 1.2 MPa. While stirring the content, 0.4 l of an aqueous solution containing 300 ppm of ammonium sulfite was continuously added for 80 minutes to initiate polymerization. As the polymerization proceeded, TFE was consumed, and the pressure in the autoclave decreased. Therefore, TFE was continuously fed in order to maintain the pressure to be constant. Upon expiration of 60 minutes after initiation of the polymerization, 1 l of an aqueous solution containing 3.6 mass % of ammonium perfluorooctanoate was added. Further, after completion of the addition of ammonium sulfite, 1 l of aqueous solution containing 8.1 mass % of ammonium perfluorooctanoate was added again. Upon-expiration of 220 minutes from the initiation of the polymerization, stirring and the feed of TFE were stopped, and TFE in the autoclave was purged, and then, the gas phase was replaced with nitrogen. The obtained PTFE aqueous dispersion containing 26.0 mass % of a solid content, was coagulated in the presence of ammonium carbonate, whereupon coagulated PTFE fine powder was separated. The obtained wet PTFE fine powder was dried at 200° C. to obtain PTFE fine powder. In the same manner as in example 1, SSG and the average particle diameter of the PTFE fine powder, the extrusion pressure during the paste extrusion, and the tensile break strength and the stress relaxation time of the stretched beading, were measured.

EXAMPLE 5

Into a 100 Q autoclave, 928 g of paraffin wax, 55 l of ultrapure water, 36 g of ammonium perfluorooctanoate, 1 g of succinic acid, 8 ml of a 1N nitric acid aqueous solution and 0.4 g of potassium bromate, were charged. Nitrogen purge and deaeration were carried out, and then, the temperature was raised to 85° C. After stabilization of the temperature, TFE was introduced to a pressure of 1.9 MPa. While stirring the content, 1 l of an aqueous solution containing 180 ppm of ammonium sulfite was continuously added for 60 minutes to initiate polymerization. As the polymerization proceeded, TFE was consumed, and the pressure in the autoclave decreased. Therefore, TFE was continuously fed in order to maintain the pressure to be constant. During the period from 40 minutes to 60 minutes after initiation of the polymerization, 1 l of an aqueous solution containing 3.6 mass % of ammonium perfluorooctanoate was continuously added. After completion of addition of ammonium sulfite, 1 l of an aqueous solution containing 8.1 mass % of ammonium perfluorooctanoate was added. Upon expiration of 250 minutes from the initiation of the polymerization, stirring and the feed of TFE were stopped, and TFE in the autoclave was purged, and then, the gas phase was replaced with nitrogen. The obtained PTFE aqueous dispersion containing 29.9 mass % of a solid content, was coagulated in the presence of ammonium carbonate, whereupon coagulated PTFE fine powder was separated. The obtained wet PTFE fine powder was dried at 160° C. to obtain PTFE fine powder. In the same manner as in Example 1, SSG, the endothermic ratio and the average particle diameter of the PTFE fine powder, and the tensile break strength and the stress relaxation time of the stretched beading, were measured.

EXAMPLE 6 (COMPARATIVE EXAMPLE)

Into a 100 l autoclave, 736 g of paraffin wax, 59 l of ultrapure water and 33 g of ammonium perfluorooctanoate, were charged. The temperature was raised to 70° C., and after carrying out nitrogen purge and deaeration, TFE was introduced to a pressure of 1.9 MPa. While stirring, 1 l of an aqueous solution containing 0.5 mass % of disuccinic acid peroxide, was injected to initiate polymerization. As the polymerization proceeded, TFE was consumed, and the pressure in the autoclave decreased. Therefore, TFE was continuously fed during the polymerization in order to maintain the pressure to be constant. From 45 minutes after the initiation of the polymerization, the temperature was raised to 90° C. at a rate of 6° C./hr. Further, when the amount of fed of TFE became 6.6 kg, 1 l of an aqueous solution containing 5.6 mass % of ammonium perfluorooctanoate, was added. Upon expiration of 160 minutes from the initiation of the polymerization, stirring and the feed of TFE were stopped, and TFE in the autoclave was purged, and the polymerization was terminated. The obtained PTFE aqueous dispersion containing 24.3 mass % of a solid content, was coagulated, end coagulated PTFE fine powder was separated. The obtained wet PTFE fine powder was dried at 205° C. to obtain PTFE fine powder. In the same manner as in Example 1, SSG and the average particle diameter of the PTFE fine powder, the extrusion pressure during the paste extrusion, and the tensile break strength and the stress relaxation time of the stretched beading, were measured.

TABLE 1

| Measured items | Ex. 1 | Ex. 2 | Ex. 3 | Ex. 4 | Ex. 5 | Ex. 6 |
|---|---|---|---|---|---|---|
| SSG | 2.148 | 2.150 | 2.154 | 2.154 | 2.150 | 2.155 |
| Average particle diameter ($\mu$m) | 483 | 473 | 538 | 494 | 500 | 478 |

TABLE 1-continued

| Measured items | Ex. 1 | Ex. 2 | Ex. 3 | Ex. 4 | Ex. 5 | Ex. 6 |
|---|---|---|---|---|---|---|
| Extrusion pressure (MPa) | 20.6 | 22.2 | 17.3 | 18.3 | — | 17.7 |
| Porosity (%) | 90 | — | — | — | — | — |
| Endothermic ratio | 0.096 | — | 0.105 | — | 0.177 | 0.182 |
| Stress relaxation time (sec) | 741 | 730 | 706 | 660 | 703 | 520 |
| Tensile break strength (N) | 37.3 | 44.3 | 34.8 | 34.3 | 33.0 | 9.8 |

From the above results, it is evident that PTFE of the present invention has a low standard specific gravity, an excellent tensile break strength and a low endothermic ratio, and it is thus useful suitably for stretching operation after paste extruded molding.

The entire disclosures of Japanese Patent Application No. 2000-331277 filed on Oct. 30, 2000, Japanese Patent Application No. 2000-331278 filed on Oct. 30, 2000, Japanese Patent Application No. 2001-226171 filed on Jul. 26, 2001 and Japanese Patent Application No. 2001-226179 filed on Jul. 26, 2001 including specifications, claims and summaries are incorporated herein by reference in their entireties.

What is claimed is:

1. A tetrafluoroethylene polymer having high stretchability, a fibrillatable character and a non-melt fabricable quality, which has a standard specific gravity of at most 2.160, a tensile break strength of from 32.0N (3.26 kg) to 49.0N (5.0 kgf), and an endothermic ratio of 0.15 or less.

2. The tetrafluoroethylene polymer according to claim 1, wherein the tensile break strength is from 34.3N (3.5 kgf) to 49.0N (5.0 kgf).

3. The tetrafluoroethylene polymer according to claim 1, wherein the standard specific gravity is at most 2.157.

4. The tetrafluoroethylene polymer according to claim 1, of which the stress relaxation time is at least 650 seconds.

5. The tetrafluoroethylene polymer according to claim 1, of which the extrusion pressure is from 9.8 MPa (100 kgf/cm$^2$) to 19.6 MPa (200 kgf/cm$^2$).

6. The tetrafluoroethylene polymer according to claim 1, wherein the tetrafluoroethylene polymer is a fine powder.

7. The tetrafluoroethylene polymer according to claim 1, wherein the tetrafluoroethylene polymer is a dispersed solid component of an aqueous dispersion.

8. A porous material made of the tetrafluoroethylene polymer as defined in claim 1, or its article.

9. A tetrafluoroethylene polymer having high stretchability, a fibrillatable character and a non-melt fabricable quality, which has a standard specific gravity of at most 2.160 and an endothermic ratio of at most 0.15 as calculated from the measurement by differential thermal analysis.

10. The tetrafluoroethylene polymer according to claim 9, wherein the endothermic ratio is at most 0.13.

11. The tetrafluoroethylene polymer according to claim 9, wherein the endothermic ratio is at most 0.10.

12. The tetrafluoroethylene polymer according to claim 9, wherein the standard specific gravity is at most 2.157.

13. The tetrafluoroethylene polymer according to claim 9, of which the stress relaxation time is at least 650 seconds.

14. The tetrafluoroethylene polymer according to claim 9, of which the extrusion pressure is from 9.8 MPa (100 kgf/cm$^2$) to 19.6 MPa (200 kgf/cm$^2$).

15. The tetrafluoroethylene polymer according to claim 9, wherein the tetrafluoroethylene polymer is a fine powder.

16. The tetrafluoroethylene polymer according to claim 9, wherein the tetrafluoroethylene polymer is a dispersed solid component of an aqueous dispersion.

17. A porous material made of the tetrafluoroethylene polymer as defined in claim 9, or its article.

18. The tetrafluoroethylene polymer of claim 1, wherein the endothermic ratio is at most 0.13.

19. The tetrafluoroethylene polymer of claim 1, wherein the endothermic ratio is at most 0.10.

20. The tetrafluoroethylene polymer of claim 1, wherein the extrusion pressure is from 9.8 MPa (100 kgf/cm$^2$) to 16.7 MPa (170 kgf/cm$^2$).

21. The tetrafluoroethylene polymer of claim 1, wherein the extrusion pressure is from 9.8 MPa (100 kgf/cm$^2$) to 15.2 MPa (170 kgfccm$^2$).

22. The tetrafluoroethylene polymer of claim 1, wherein the stress relaxation time is at least 700 seconds.

23. The tetrafluoroethylene polymer of claim 1, wherein stress relaxation time is at least 730 seconds.

\* \* \* \* \*